J. LYKER.
Fertilizer.
No. 30,179.                                        Patented Sept. 25, 1860.
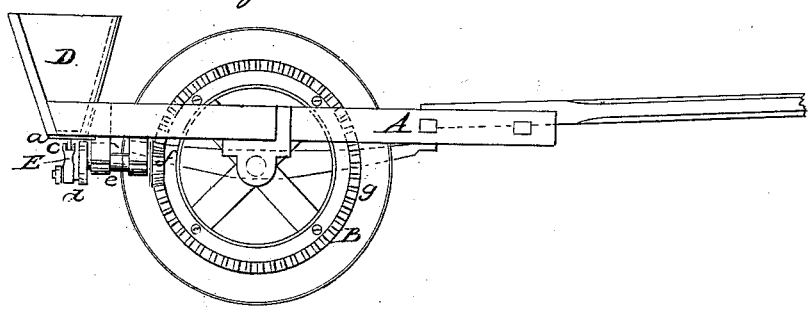
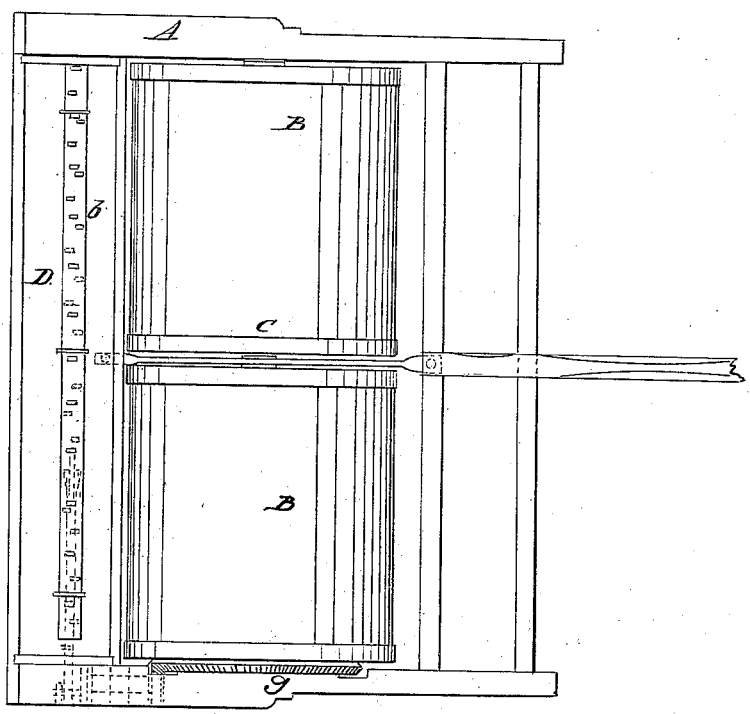
Witnesses.
J. W. Coombs
R. S. Spencer
Inventor.
John Lyker
per Munn & Co
attorneys

UNITED STATES PATENT OFFICE.

JOHN LYKER, OF ARGUSVILLE, NEW YORK, ASSIGNOR TO HIMSELF AND J. I. BROWN, OF SAME PLACE.

IMPROVEMENT IN COMBINED ROLLER AND MANURE-SPREADER.

Specification forming part of Letters Patent No. 30,179, dated September 25, 1860.

*To all whom it may concern:*

Be it known that I, JOHN LYKER, of Argusville, in the county of Schoharie and State of New York, have invented a new and useful Combination of a Roller and Manure-Sowing Machine; and I do hereby declare that the following is a full, clear, and exact description of the same, reference being had to the annexed drawings, making a part of this specification, in which—

Figure 1 is a side sectional view of my invention. Fig. 2 is a plan or top view of the same.

Similar letters of reference indicate corresponding parts in the two figures.

To enable those skilled in the art to fully understand and construct my invention, I will proceed to describe it.

A represents a rectangular frame, which is mounted on rollers B B'. These rollers may be of metal or wood, or both materials combined, and they are placed in the frame A, side by side, on a common stationary shaft, C, the rollers being allowed to rotate independently of each other.

On the back part of the frame A there is placed a box or hopper, D. This box or hopper extends the whole width of the frame A, and is provided with a perforated bottom, $a$, and a perforated slide, $b$, which is placed within the box or hopper on its bottom $a$. This slide $b$ projects through the ends of the box or hopper, and has a pendant, $c$, attached to it, said pendant projecting down through a slot in the bottom $a$, and having a rod, E, connected to it, said rod being attached at its outer end to a crank-pulley, $d$, which is placed on the back end of a shaft, $e$, at the under side of the frame. On the front end of the shaft $e$ there is placed a pinion, $f$, which gears into a toothed rim, $g$, at the outer end of the roller B'.

From the above description it will be seen that as the implement is drawn along the rollers B B' will perform their usual function—to wit, roll the ground, crushing all clods, &c.—while from the box or hopper D the fertilizer will be distributed or sown, the same falling directly behind the rollers, the slide $b$ being operated through the medium of the gearing $f g$, crank-pulley $d$, and connecting-rod E.

Having thus described my invention, what I claim as new, and desire to secure by Letters Patent, is—

The arrangement of the rollers B B' with the frame A, gear-wheels $f g$, connecting-rod E, hopper D, pendant $c$, and slide $b$, all as herein shown and described, for the purposes set forth.

JOHN LYKER.

Witnesses:
 FREEMAN P. MOULTON,
 JOHN F. CHRISTMAN.